Feb. 18, 1958 W. H. MORGAN 2,823,746
WINDSHIELD PROTECTOR
Filed Jan. 10, 1955
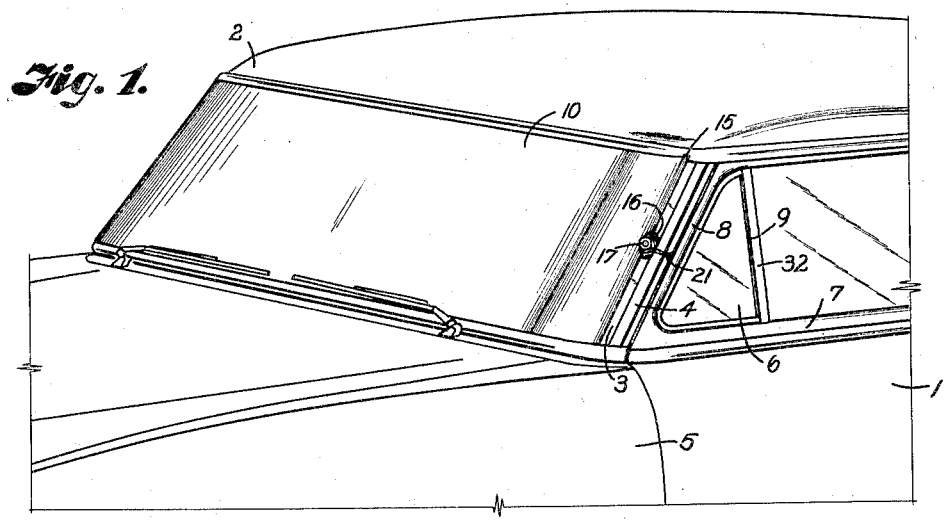
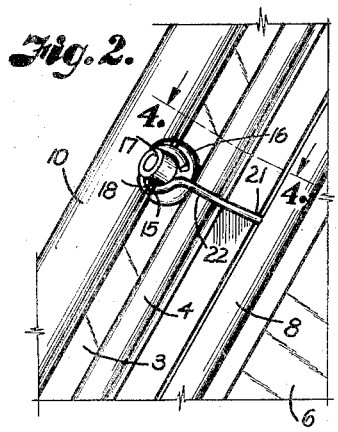
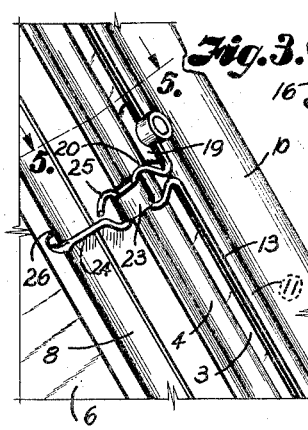
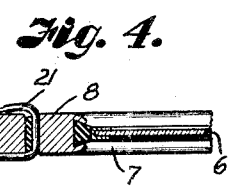
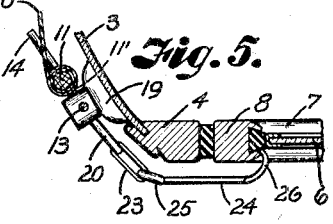
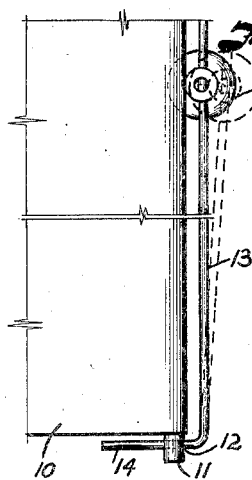
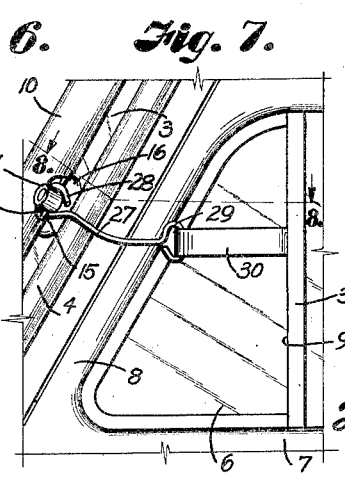
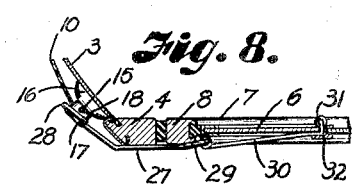
INVENTOR.
William H. Morgan.
BY
Fishburn & Mullendore
ATTORNEYS.

United States Patent Office 2,823,746
Patented Feb. 18, 1958

2,823,746

WINDSHIELD PROTECTOR

William H. Morgan, Topeka, Kans.

Application January 10, 1955, Serial No. 480,652

2 Claims. (Cl. 160—368)

This invention relates to a windshield protector, and more particularly to a device for preventing snow, frost and ice or the like from accumulating on the windshield when the automobile is exposed to the weather.

It is well known that when an automobile or other vehicle having a windshield made of glass or the like is exposed to the elements during cold weather the windshield will become covered over with ice, frost or snow, should snow be falling while the automobile is standing in the weather. Also during rain when the temperature is below freezing ice will also collect on the windshield while the automobile is inoperative and no heater working to keep the ice from accumulating on the windshield. At the present time the most common way to remove the ice, snow and frost from the windshield is by a scraper or the like.

It is the principal object of the present invention to provide a device for covering the windshield of a vehicle, such as an automobile or the like, while the vehicle is standing and subject to the weather. In other words, the device is particularly adaptable to users of automobiles who do not have garages in which to store them during cold weather. It is also adaptable for users of automobiles who leave their cars out even for short periods of time during cold or stormy weather.

Other objects of the present invention are to provide a sheet of resilient or flexible material, such as plastic, rubber or the like to cover the windshield of the vehicle; to provide a pole upon which the plastic or flexible material may be rolled; to provide a rod for engaging the other end of the strip of plastic material; to provide the plastic material of a length to fit any size windshield and adjustable thereto by leaving part of the roll on the pole; to provide suction cups on one of the rods for engaging the windshield of the automobile near the corner post of the top; to provide a rod engaging the pole upon which the plastic material is rolled also having a suction cup for engaging the opposite side of the windshield near the other corner post of the top; to provide fastening means on the rods and suction cups for engaging the corner post of the automobile or to the corner post of the door above the body of the vehicle; to provide means for attachment to the suction cups and rods which will engage across the swingable wing type window of the doors of the automobile and be held in place between the straight edge of the glass and the frame of the door; to provide a device which may be quickly adjusted and stretched across the windshield and fastened to the corner post or window post of the doors of the automobile; and to provide a device of this character, simple and economical to manufacture.

In accomplishing these and other objects of the present invention, I have provided improved details of structure, the preferred forms of which are illustrated in the accompanying drawings, wherein:

Fig. 1 is a perspective view of the front of an automobile with my device attached to the windshield.

Fig. 2 is an elevational fragmentary view of the corner post of the top of an automobile showing the hook member attached thereto.

Fig. 3 is an elevational fragmentary view showing the opposite end of the device attached to the opposite corner showing the fastening means attached to the door post of the door of the vehicle.

Fig. 4 is a cross-sectional view showing one of the hook members attached to the corner post.

Fig. 5 is a cross-sectional view of the other fastening device shown attached to the door frame of the automobile.

Fig. 6 is an enlarged fragmentary view of the pole upon which the plastic material is wound and the wire rod secured to the respective ends thereof.

Fig. 7 is an enlarged fragmentary view of a modified form of my invention showing the fastening member secured to the winged window of the door of an automobile.

Fig. 8 is a cross-sectional view showing the modified form of the invention attached to the window of the automobile.

Referring more in detail to the drawings:

1 designates an automobile having a top 2, a windshield 3 with corner posts 4 attaching the top to the frame 5 of the automobile. 6 represents the swingable or ventilated window of the door 7 of an automobile having a frame or post 8 at its forward end. The window or vent 6 is swingable at the will of the operator as is the usual practice so that the straight edge 9 will be extended outwardly.

10 designates a sheet of plastic material such as vinyl plastic or other flexible material, one end of which is rolled upon a post 11 as illustrated at 11' (Fig. 5) having transverse openings 12 in each end thereof, and a wire rod 13 having its ends turned laterally as indicated at 14 is adapted to engage in said openings in the end of the post 11 to prevent rotation of the post. The ends of the plastic material may be secured to the post 11 by some suitable means such as adhesive, heat treatment or the like. Attached to the opposite end of the sheet of plastic material is a rod or the like 15, to which the plastic material may be secured by adhesive, heat treatment or other suitable means. A suction cup 16 is mounted on the rod 15 near the center thereof, the suction cup having a stem 17 and an opening 18 through which the rod 15 extends. The wire rod 13 is also provided with a suction cup 19 similar to the suction cup 16. The rod 13 is provided with a loop 20 near the center thereof.

For securing the device to the windshield of an automobile, I provide a hook 21 having a body 22 with one end looped around the rod 15 and the stem 17 of the suction cup 16 as best illustrated in Fig. 2. The other end of the hook member is turned laterally and then turned parallel to the main body portion 22 to engage around the corner post 4 of the top of the vehicle as best illustrated in Fig. 4. The loop 20 on the rod 13 engaging the pole 11 is provided with a loop 23 of rubber or the like and a hook 24 having a loop 25 engages the loop 23. The other end of the hook 24 is turned laterally as indicated at 26 (Fig. 5) and engages the frame 8 of the door 7 of the automobile adjacent the swingable window 6 also as best illustrated in Fig. 5. When the device is not in use both ends 14 of the rod 13 are withdrawn from the openings 12 in each end of the pole 11 and the entire plastic sheet is rolled around the pole 11 for storage. Then when it is desired to place the same on the windshield of an automobile, the plastic sheet is unrolled to not quite the length of the windshield and the ends 14 of the rod 13 again inserted in the openings 12 of the pole 11. The suction cup 19 then engages the windshield as illustrated in Fig. 3 and the end 26 of the hook 24 engages the door frame. The sheet of material is then stretched taut across the windshield and the suction cup 16 engages the edge thereof as illustrated in Fig. 2 and the hook member engages the corner post 4 of the automobile by opening of the door 7 and then closing the same as illustrated in Fig. 4. The openings 12 are such that the ends 14 of the rod 13 fit snugly therein and when the sheet material is stretched taut and the suction cup is placed on the windshield the wire rod 13 will bend slightly, thus causing the end 14 to bind in the openings 12 and be held therein by friction as indicated in dotted lines in Fig. 6. It will thus be seen the device is quickly placed on the windshield and may be just as quickly displaced therefrom.

Figs. 7 and 8 represent a modified form of the invention and particularly the fastening means. The plastic sheet 10, pole 11 and rods 13 and 15 are identical. In the modified form I provide a link 27 having a looped end 28 engaging the rod 15 and stem 17 of the suction cup 16. The opposite end is provided with a loop 29 to which is engaged an elastic strip 30 having an enlarged end 31 such as a metal retainer or the like pressed upon the end of the plastic strip. With this form of fastening means the plastic sheet is placed upon the windshield in the same manner as in the preferred form of the invention and the elastic strip stretched across the swingable window 6 of the door of the automobile and engages between the straight edge 9 of said window and the frame 32 of the main portion of the window as best illustrated in Fig. 8. Closing of the swingable window 6 retains the fastening means thereon.

It will be obvious from the foregoing that I have provided an improved windshield protector and a novel fastening means which provides for quick assembly and disassembly of the structure to a vehicle.

What I claim and desire to secure by Letters Patent is:

1. A windshield protector for a vehicle having corner posts and a door frame swingable thereon comprising, a sheet of plastic material having one end wound upon a pole, a rod having ends secured to the pole in a manner to hold the latter against rotation, a suction cup on said rod for engaging one side edge of the windshield, means on said rod for engaging the door frame of the vehicle, a second rod secured to the other end of the plastic sheet of material, a suction cup on said last-named rod for engaging the other side edge of the windshield, a hook member having one end engaging said suction cup and its other end engaging the corner post for retaining the sheet of material in taut condition across the windshield and the suction cups engaging the opposite side edges of the windshield.

2. A windshield protector for a vehicle having corner posts and a door frame swingable thereon comprising, a sheet of flexible material having one end wound upon a pole, said pole having openings transversely through each end thereof, a rod having its ends turned laterally and secured in said openings in the pole in a manner to hold the latter against rotation, a suction cup on said rod near the center thereof, a hook member on said rod for engaging the door frame of the vehicle, a second rod secured to the other end of the flexible sheet of material, a suction cup on said last-named rod, a hook member having one end engaging said last-named suction cup and its other end engaging the corner posts on the side of the vehicle opposite the first mentioned hook for retaining the sheet of material in taut condition across the windshield and the suction cups engaging the opposite side edges of the windshield.

References Cited in the file of this patent

UNITED STATES PATENTS

| | | |
|---|---|---|
| 2,223,145 | Wise | Nov. 26, 1940 |
| 2,437,845 | Wyeth | Mar. 16, 1948 |
| 2,646,118 | Berty | July 21, 1953 |